Figure 1:
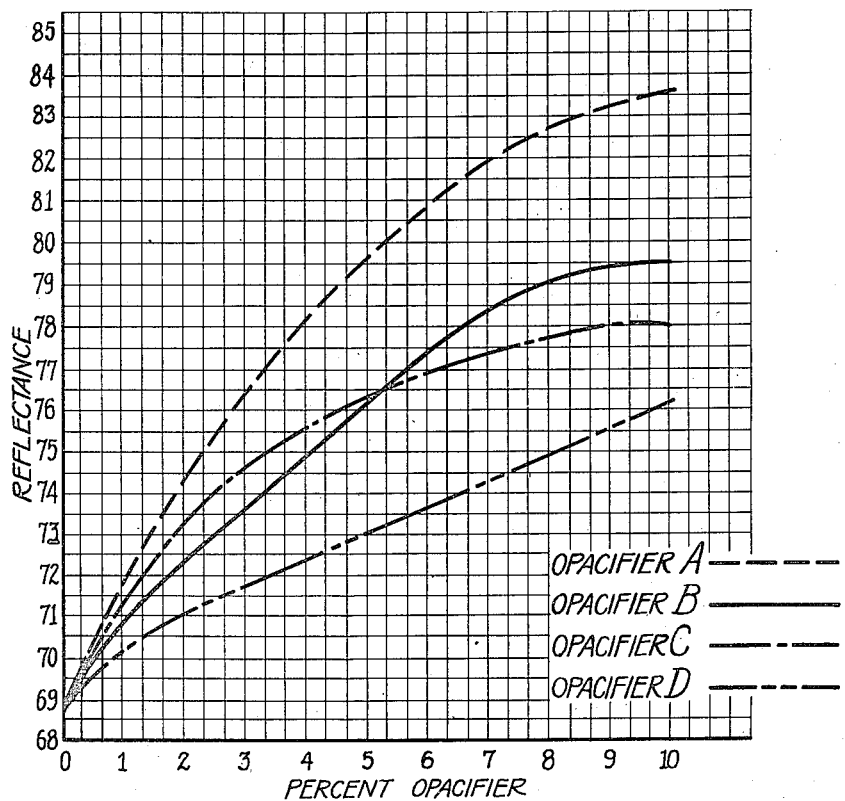

Feb. 9, 1943. C. J. KINZIE 2,310,242
ZIRCONIUM OXIDE OPACIFIER AND METHOD OF MAKING SAME
Filed Nov. 1, 1938 3 Sheets-Sheet 1

INVENTOR.
CHARLES J. KINZIE
BY
ATTORNEY.

SEMI-OPAQUE FRIT

SUPER-OPAQUE FRIT

Feb. 9, 1943. C. J. KINZIE 2,310,242
ZIRCONIUM OXIDE OPACIFIER AND METHOD OF MAKING SAME
Filed Nov. 1, 1938 3 Sheets-Sheet 3

INVENTOR.
CHARLES J. KINZIE
BY
ATTORNEY.

Patented Feb. 9, 1943

2,310,242

UNITED STATES PATENT OFFICE 2,310,242

ZIRCONIUM OXIDE OPACIFIER AND METHOD OF MAKING SAME

Charles J. Kinzie, Niagara Falls, N. Y., assignor to The Titanium Alloy Manufacturing Company, New York, N. Y., a corporation of Maine Application November 1, 1938, Serial No. 238,139

7 Claims. (Cl. 106—312)

My invention relates generally to the production of pigmenting or opaquing compounds composed chiefly of zirconium oxide for use in vitreous enamels and in other glass products that will have high opaquing values, and its objects comprise improved methods for eliminating the impurities that would discolor the final enamel so as to render the latter of the desired whiteness and opacity.

The increasing importance of zirconia or zirconium oxide as an opacifier in lieu of tin oxide, antimony oxide, etc., in enamelling, has recently stimulated invention of various processes for separating zirconium oxide from such undesirable impurities as silicon, iron, titanium, etc., which are usually found in natural zirconium ores. My invention relates more particularly to the derivation of high opacity zirconium oxide from zirconium oxides resulting from the electrothermal decomposition of zircon (ZrSiO₄), into zirconium intermediates, such as zirconium cyanonitrides, carbides or carboxides, and then calcining to the oxide in contact with oxygen. Zirconium oxides produced by such methods contain impurities such as silicon carbide and other carbides which render the product unsuited for vitreous enamel opaquing purposes as well as for paint and lacquer pigment purposes.

In the case of vitreous enamels, glazes, etc., the zirconium oxide containing such impurities yield enamels having a grayish color and poor gloss, while in paints and lacquers the required whiteness cannot be secured with such impure ZrO₂ products. In the opacity readings by which the degree of opacification is now determined for enamels by the reflectance test are obtained through the use of instruments known as opacimeters. Such opacimeters are in general use in the ceramic industry, and certain standards have been set up where the enameled article has two coats of enamel successively applied and fired.

The discoveries of my present invention are in part an important improvement over the process and products of my U. S. Patent No. 2,102,627 of December 21, 1937. An important phase of my invention is the discovery of a means and methods for the removal of alkali metal reagents from the zirconium oxide and the deposition of a content of a dried residue of a hydrous gel. The combined effect is a new and improved zirconium oxide composition, and a new and improved method for making such composition. The product has remarkable superopaquing effects, is free of the deleterious effects of an alkali metal content, and, when added at the mill to vitreous enamel slips, has the property of stabilizing such slips through the adsorbtive effects of the dried residue of the hydrous gel in cooperation with the zirconia on soluble salts formed in the enamel frit milling and ageing. By adsorbing certain salts from solution the slips are thereby rendered more stable.

My U. S. Patent No. 2,102,627 describes methods for producing a vitreous enamel white opacifying agent from a variety of zirconium oxide materials in which the zirconia is mixed with less than 40% of its weight of sodium carbonate and sodium nitrate. This mixture is heated between 800–950° C., cooled, and then optionally used either directly or leached with water. Sodium compounds remain in the water-washed products to the extent of 0.50 to about 5% depending on the purity of the starting zirconia. Various zirconium opacifier compounds having an appreciable sodium content have enjoyed a certain degree of success in certain types of enameling operations, while in others the enamel products have been rejected, based on the fact that, under certain enamel drying and firing conditions, the mill-added opacifier containing sodium salts in combination were affected by the presence of sulphur gases in the atmosphere with resultant dulling of the enamel. The sulphur gases were adsorbed by the soda-carrying zirconium opacifier compound so as to form sodium sulphate compounds, which cause the enamel to be dull or non-lustrous when fired. Another objection to the use of the soda-containing zirconium opacifier compounds is that in contact with the enamel mill liquor, and particularly as the enamel slip ages, the soda compounds in these zirconium opacifiers are released to some extent and change the slip consistency to such an extent that the enamel becomes unusable unless setting up salts are added. In contrast to this, my new zirconium oxide, characterized as being essentially free of sodium compounds and having on drying a content of a residue of a gelatinous precipitate, serves to keep the enamel slips stable in use. In addition, the enamels, even those containing high percentages of my new zirconium oxide product, fire to lustrous surfaces and do not dull or develop socalled sulphur scum.

After many experiments and tests, I found that the soda-containing zirconium oxide opacifiers of my U. S. Patent No. 2,102,627 may be considerably improved by the following procedure: The opacifier product described in such patent is digested for a suitable period of time with dilute acid, such as hydrochloric acid, and then the excess acid is neutralized by the addition of ammonia, so as to precipitate the small amount of zirconium compound dissolved by the acid. The sodium compounds remain in solution. The precipitate formed by the ammonia addition is gelatinous in nature, and serves to flocculate the zirconium oxide crystals forming the bulk of the opacifier product. The flocculated product is washed with water, and is then dried to form a zirconium oxide opacifier containing practically no alkali metal compounds. Such product, when used at the mill in vitreous enameling, will opacify to white lustrous enamel finishes which are not adversely affected by sulphur gases during the firing of the enamel.

In the above procedure, the reactions that take place are probably represented by the following equations, although it is to be understood that this is theoretical, and that I claim a new process and product, irrespective of what chemical reactions take place during the steps of my process. The insoluble sodium compound is apparently present as sodium zirconium silicate. When treated with hydrochloric acid, it dissolves according to the following equation:

$$Na_2ZrSiO_5 + 4HCl \rightarrow ZrOCl_2 + 2NaCl + 4H_2O + SiO_2 \text{ (gel)}$$

When the aqueous solution of $ZrOCl_2$ is treated with $NH_4OH$, a gelatinous precipitate of zirconium hydrate forms, somewhat according to the following equation:

$$ZrOCl_2 + 2NH_4OH + H_2O \rightarrow Zr(OH)_4 + 2NH_4Cl$$

I have also discovered that with more closely controlled proportions of zirconia and soda ash and more closely controlled roasting thereof, better and more uniform results are obtained than is possible when using the methods described in U. S. Patent No. 2,102,627.

I have further discovered the reason why this roasting of zirconia with soda ash results in a product of higher opaquing power in vitreous enameling. Such result is due to the unique property of the soda ash in forming from large zirconia crystals a number of smaller zirconia crystals. But if the size and shape of the starting zirconia crystals are of certain proportions, and the temperature and time and conditions of the heating are closely controlled with the reaction arrested at the proper point, there results a remarkable uniformity of size of the resultant zirconia crystals. In U. S. Patent No. 2,102,627 (Example J), I showed that too high a temperature in the reaction had a deleterious effect, and the resultant product was not as opaque in the enamel as were others which were properly roasted. I now find that if the heating is too severe, the reformed zirconia crystals may become too large under certain conditions of misprocessing, while under other conditions some of the crystals may be too small in size to be the most effective opacifiers.

Suitable conditions for the production of the uniform desired size zirconia crystals are:

(A) Uniformity of shape and size of starting zirconium crystals, preferably a starting zirconium oxide about 1 to 1½ microns in size, such as the relatively thin zirconia plates described in Kinzie and Hake Patent No. 2,194,426 or the intermediate zirconia described in Kinzie and Hake Patent No. 2,168,603.

(B) The use of only the proper amount of soda ash required, thereby avoiding any excess which tends to so rapid a reaction as to be too difficult of control; suitable proportions of soda ash to zirconia above 96% purity are from 4 to 7 parts $Na_2CO_3$ to 100 parts zirconia—preferably 5 parts $Na_2CO_3$ by weight.

(C) A temperature in the charge close to 900° C. coupled with a condition of agitation of the charge during the heating to ensure a uniform progress of reaction throughout all parts of the charge as well as the arresting of the reaction by withdrawal of the charge when the zirconia has become of the desired particle size.

To illustrate the importance of the size and shape of the starting zirconia crystals, let us take the starting zirconia of Example B of my U. S. Patent No. 2,102,627. This zirconia when milled in commercial ball mills contains some crystal particles considerably above two microns, while the bulk of the material may be from 0.5 to 2 microns in the form of fractured crystals. For purposes of illustration I will assume that the crystals of zirconia are cubes regardless of the size and that 100 cubes are treated consisting of 5 ten micron cubes (i. e. cubes 10 microns long in all three dimensions) and 95 one micron cubes (i. e. cubes 1 micron long in all three dimensions). Numerically the mixture contains 95% one micron cubes and 5% ten micron cubes. However, each ten micron cube is equal in weight to 1,000 cubes of the one micron size with the 5 cubes equal in weight to 5,000 one micron cubes. Thus the mixture containing numerically 95% one micron cubes is made up when converted to percent by weight of 98.14% by weight of ten micron cubes and only 1.86% by weight of one micron cubes.

When such a mixture of zirconia crystals is reacted with soda ash, it is impossible to produce a zirconia product of uniform crystal size. By way of illustrating the point, I will assume that the effect of the soda ash is to remove a layer of half micron cubes from the surface of each starting zirconia cube. From each of the ten micron cubes, there would form a total of 2,168 half micron cubes to each, or a total of 10,840 half micron cubes so as to leave the 5 ten micron cubes each now reduced to nine micron cubes each one micron cube would form 8 half micron cubes with no residue, or a total of 760 cubes of half micron size from the original 95 cubes of one micron size. A total of 11,600 cubes of half micron size has been formed. The 5 remaining cubes, each of nine micron size, represent a theoretical potential source of 29,160 cubes of half micron size representing about 72% of the potential half micron cubes in the original charge. Since the reaction must be arrested in time to avoid the formation of undesired particle sizes from the half micron cubes, it is not possible to penetrate deeper into the nine micron cubes. The opaquing value is locked up in these, and the process is only about 28% efficient, due to the presence of only these 5 ten micron cubes in the original total of 100 cubes.

The foregoing illustration represents precisely what occurs with a starting material of fractured coarse crystals produced by milling and disintegration of intermediate zirconium oxides, such as produced from the oxidation of either zirconium carbide or zirconium cyanonitride or synthetic baddeleyite or electrically fused zirconium oxide, since commercially it is impossible to mill all the particles to any definite degree of fineness. There always remains a certain proportion of large particles which escape the milling. Though the percentage of coarse crystals may be numerically small, the foregoing illustration shows that these may be so importantly great in effect as to prevent success in the resulting enameling.

I have mentioned that the zirconia with an adsorbed $CO_2$ content, as completely described in Patent No. 2,194,426, and the essentially similar material produced as the intermediate $ZrO_2$ in Patent No. 2,168,603 containing 0.4 SiC are suitable raw materials in my process. These particles are relatively thin, seldom, if ever, more than 1 micron thick regardless of the length and breadth. The soda ash reagent readily disintegrates these thin plates into numerous zirconia particles of suitable size, since a zirconia plate 7 x 5 microns and 1 micron thick would rapidly disintegrate into at least 70 zirconia particles of 0.5 micron size.

In view of the fact that the proportions of sodium carbonate and zirconia, the mode of mixing the charge, the method used in heating and control, the leaching with water, the dilute acid treatment followed by the ammonia neutralization, etc., are practically the same for each of the two zirconium oxides just referred to as being suitable starting materials for my improved methods, I will now present one complete example to show how my methods may be practiced to produce my novel zirconium oxide product.

EXAMPLE

In this example I use a starting zirconium oxide having the following analysis: This material was produced by the method according to Example 1 of U. S. Patent No. 2,168,603.

| | Percent |
|---|---|
| $ZrO_2$ | 97.40 |
| $TiO_2$ | 0.07 |
| $Fe_2O_3$ | 0.01 |
| SiC | 0.40 |
| $CO_2$ | 1.80 |
| $Al_2O_3$ | 0.02 |
| CaO | 0.08 |
| $CeO_2$ | 0.10 |
| $La_2O_3$ | 0.001 |
| $HfO_2$ | 0.08 |
| $P_2O_5$ | 0.02 |
| | 99.981 |

This zirconium oxide has, as I have stated, essentially the same structure and characteristics as that described in detail in Patent No. 2,194,426. Either one of the above zirconium oxides may be used for this purpose, since both react in the same manner. 100 parts by weight of this zirconium oxide and 5 parts by weight of sodium carbonate are thoroughly mixed together, and charged onto the hot hearth of a gas or oil fired semi-muffle furnace at a temperature of about 950° C. The entire charge is stirred by a heat resisting rabbling tool at ten minute intervals, and samples withdrawn for microscopic examination at intervals to determine the course of the reaction.

Under these conditions it should be found that the thin zirconia crystals are reduced to approximately 0.5 micron particle with the adsorbed carbon dioxide completely released and the silicon carbide crystals decomposed to colorless harmless silicates at about the same time; at least the heating may be prolonged under these conditions of uniform temperature and frequent stirring so that all three objects of this particular heating may be concluded with the desired results. The charge is then withdrawn from the furnace into a shallow iron box lined with a suitable refractory, and is stirred to ensure a sufficient lowering of temperature so as to avoid any continued reaction. The charge is then cooled and charged into water contained in a suitable vessel equipped with an agitator. I prefer to use 12 parts by weight of water to 1 part by weight of solids, and this charge is stirred for about four hours, or long enough to dissolve the water-soluble sodium compounds.

If a portion of the charge is withdrawn at this stage and thoroughly washed and dried, there would be present about 1 percent of sodium calculated as $Na_2O$; at this stage, however, it is combined as sodium zirconium silicate which is a water insoluble compound. The charge is now pumped from the vessel through a 325 mesh sieve to remove any impurities gathered in the processing, and such charge after passing through the sieve is caused to flow through a powerful magnetic field to remove magnetic impurities. The purified slurry then passes into a settling tank where it is allowed to settle, and as much as possible of the alkaline solution is decanted. The residue in the tank is now stirred thoroughly to bring into suspension all the settled solids. To this suspension there is now added 7 parts by weight of 1.18 sp. gr. hydrochloric acid to each 100 parts by weight of the solids present, and the stirring of the charge continued until all the sodium compounds are dissolved. This stirring requires a period of about 6 hours. While still stirring the charge, I add ammonia, either as aqua ammonia or inject gaseous $NH_3$, until the charge is neutral or slightly alkaline. The ammonia neutralizes the acid, decomposes acid salts, and precipitates any dissolved compounds of zirconium, titanium, iron, etc., in the form of a gelatinous precipitate which gathers the zirconia particles into a condition where these along with the gelatinous precipitate deposited thereon are easily washed in a filter press or other suitable means. The product is then thoroughly water-washed and dried at about 120° C.; the dried product is disintegrated in any suitable machine, and is drylawned through a silk bolting cloth of about 200 mesh to remove any impurities which have been introduced in the processing.

The product is now in the finished form of a white powder ready for use, and the following table represents the result of a careful chemical and spectrographic analysis:

| | Per cent |
|---|---|
| $ZrO_2$ | 98.38 |
| $SiO_2$ | 0.70 |
| $Fe_2O_3$ | 0.09 |
| $TiO_2$ | 0.07 |
| $Na_2O$ | 0.001 |
| $Al_2O_3$ | 0.02 |
| CaO | 0.08 |
| $La_2O_3$ | 0.001 |
| $CeO_2$ | 0.10 |
| $HfO_2$ | 0.08 |
| $P_2O_5$ | 0.02 |
| MgO | 0.01 |
| CuO | 0.01 |
| $V_2O_5$ | 0.005 |
| Ign. loss including moisture | 0.61 |
| | 100.177 |

The 0.61 percent $H_2O$ represents the water still held in the dried gelatinous precipitate of zirconium hydrate, silicic acid, etc. This $H_2O$ is not entirely eliminated in drying, but is evolved or lost at about 500° C., and so is given off below vitreous enamel maturing temperatures. The product contains approximately 1 per cent by weight of the dried residue of the gelatinous precipitate which serves as a buffering agent in vitreous enamel slips to aid in the maintenance of stable enamel slip consistency, thereby avoiding the use of additions of electrolytes or at least minimizing such additions to the slip to keep the frit particles in suspension.

The starting zirconia used in this example is made up almost exclusively of thin plates not more than 1 micron thick but often several microns wide and longer than wide. The following represents a particle size count made under the high power microscope with a specimen of this $ZrO_2$ containing adsorbed $CO_2$:

Practically no particle below 0.5 micron
About 15% of particles between 0.5 and 1.5 microns
About 25% of particles between 1.5 and 3.5 microns
About 45% of particles between 3.5 and 6 microns
About 12% of particles between 6 and 10 microns
About 3% of particles between 10 and 15 microns These measurements are based on particle length.

In contrast the product produced in the foregoing example illustrating my improved methods was of the following particle size range:

About 2% less than 0.4 micron
About 95–98% in the range of 0.4 to 0.90 micron, with practically none above 1 micron A specimen of this new zirconium oxide product has been examined under the high power microscope under conditions suitable to produce the Brownian movement, and it was found definitely that these zirconium oxide particles exhibit the characteristic of being considerably thinner than they are long or wide, and that the thickness of the particles was a half or less than the average width and length. This novel zirconium oxide, therefore, inherits a characteristic of the parent oxide, and may thus be classed as a $ZrO_2$ in the range mainly 0.4 to 0.9 micron dimensions as to length and width, and from about 0.20 to 0.45 micron thick.

In studying the properties of opacifiers in vitreous enamels, the usual practice is to make mill additions in the commonly used percentages, say 3 to 6 per cent. However in the case of my experiments I have made a series of enameling tests in which my novel products were added at the mill in amounts of 1, 2, 3, 4, 5, 6, 7, 8, 9 and 10 parts by weight to each 100 parts by weight of the frit, milling each with 6 parts by weight of enameler's clay and water to a fineness of 10 grams residue on 200 mesh sieve from a 100 cc. sample slip, then applying each enamel at the rate of 72 grams per sq. ft. total in two coats, firing each coat at 1500° F. for 2½ minutes, determining the reflectance by the method heretofore described, and plotting the reflectance results as against the percentage mill addition of the opacifier.

Figure 1 shows the reflectance results obtained in a series of such enameling tests in which four opacifiers were tested in steps of 1% from 1 to 10 percent additions. In all cases where I refer to 1% mill addition, I mean 1 part by weight of the opacifier to each 100 parts by weight of the frit used, thus adhering to the usual practice followed in the enameling industry. The frit used here was an opaque frit.

"Opacifier A" represents the zirconium oxide produced in the foregoing detailed example containing 98.38% $ZrO_2$ and 0.001% $Na_2O$.

"Opacifier B" represents a zirconium oxide opacifier prepared by my new process in which the water washed $ZrO_2$ opacifier of Example B of U. S. Patent No. 2,102,627 was treated with hydrochloric acid using 16 parts by weight 1.18 sp. gr. HCl to 100 parts by weight of solids followed by stirring for about 16 hours at about 50° C. and then adding ammonia to neutralize; this was followed by washing and drying and disintegration to produce by my new method herein described a relatively soda free zirconium oxide containing a substantial percentage of a residue from the gelatinous precipitate. An analysis of this product follows.

| | Per cent |
|---|---|
| $ZrO_2$ | 91.46 |
| $TiO_2$ | 0.20 |
| $SiO_2$ | 5.00 |
| $Na_2O$ | 0.30 |
| $CaO$ | 0.25 |
| $Al_2O_3$ | 0.20 |
| $Fe_2O_3$ | 0.09 |
| $CeO_2$ | 0.10 |
| $HfO_2$ | 0.10 |
| Moisture and ignition loss | 2.15 |
| Others | 0.15 |
| | 100.00 |

"Opacifier C" was the best available enamelers grade of tin oxide containing over 99% $SnO_2$.

"Opacifier D" was the zirconium oxide opacifier produced by the process described in my U. S. Patent No. 1,588,476 of June 15, 1926, when using modern purer materials so as to have the following composition by analysis:

| | Per cent |
|---|---|
| $ZrO_2$ | 87.40 |
| $TiO_2$ | 0.29 |
| $SiO_2$ | 7.50 |
| $Na_2O$ | 1.30 |
| $CaO$ | 0.25 |
| $Al_2O_3$ | 1.50 |
| $Fe_2O_3$ | 0.07 |
| $F_2$ | 1.00 |
| $CeO_2$ | 0.10 |
| $HfO_2$ | 0.10 |
| Moisture and ignition loss | 0.36 |
| Others | 0.13 |
| | 100.00 |

Figure 1 reflectance results shows my new zirconium oxide to be far above any of the other three opacifiers, 4% being as effective as 10% $SnO_2$, while 5¼% of such $ZrO_2$ is as effective as 10% of "Opacifier B" $ZrO_2$, and 2¾% of such $ZrO_2$ doing the work of 10% zirconium oxide of "Opacifier D."

It will be observed that my new zirconium oxide is above tin oxide in effectiveness throughout the entire range, and that it does not materially decrease in its effectiveness in the high percentages.

Zirconium oxide "Opacifier B" also made by my process, however, is not as effective as SnO₂ until a little over 5% addition is reached, but above this point it is more effective than tin oxide. The zirconium oxide "Opacifier D" is not very effective in this enamel.

The following particle size data will serve to explain some of the reasons why my new zirconium oxide is such a powerful opacifying agent.

*Opacifier A.*—This is made up of particles of which 95 to 98% are in the range 0.4 to 0.90 micron, there being less than 2% under 0.40 micron in size and practically none over 1 micron in size. The ZrO₂ from which this product was made consisted of plates of 1 micron or less in thickness.

*Opacifier B.*—This is made up of a range of particle sizes; the particle dimensions appear approximately equal in all directions for all the various sized particles.

| | Per cent |
|---|---|
| Particles below 0.5 micron | About 1 |
| Particles between 0.7 and 1.5 microns | About 95 |
| Particles between 1.5 and 2.5 microns | About 3 |
| Particles above 2.5 microns | 1 |

*Opacifier C.*—This is made up of particles quite uniform in size, the dimensions appear the same in all direction. About 98% of the particles are close to 0.6 micron with only 1% less than 0.5 micron and only about 1% above 1 micron.

*Opacifier D.*—This material is composed of a wide range of particle sizes in which the dimensions are approximately equal in all directions.

| | Per cent, about |
|---|---|
| Particles below 0.5 micron | 5 |
| Particles 0.5 to 1 micron | 15 |
| Particles 1 to 2 microns | 60 |
| Particles 2 to 3 microns | 15 |
| Particles above 3 microns | 5 |

Figure 2:
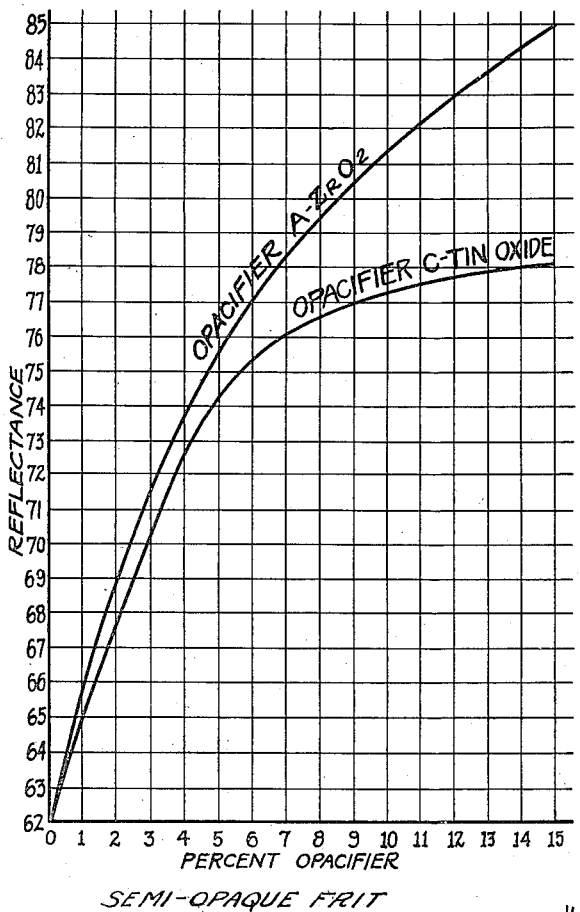

Figure 2 shows the results when my new ZrO₂ opacifier was tested in steps of one part by weight to 100 parts of a semi-opaque frit used in enameling on sheet iron in the range of 1% up to 15% in comparison with the best available enameler's grade of tin oxide. When used as an opacifier with this semi-opaque frit tin oxide continued to be effective up to 5%, as shown by the uniform reflectance increase, but above 5% the increase in reflectance was much less rapid. My novel zirconium oxide served as an effective opacifier throughout the range 1 to 15% and was higher than tin oxide in opacifying effects throughout the entire range involved. The maximum reflectance produced in this series by tin oxide was about 78.1 with 15% tin oxide to 100 parts of the frit, while in comparison the results show that 7 parts by weight of my new zirconium oxide produced a reflectance of 78.1 in this particular enamel and was thus more than twice as effective as tin oxide in increasing the reflectance. The 15 parts by weight to 100 parts frit test shows my new oxide to have increased the reflectance to about 85.

Figure 3:
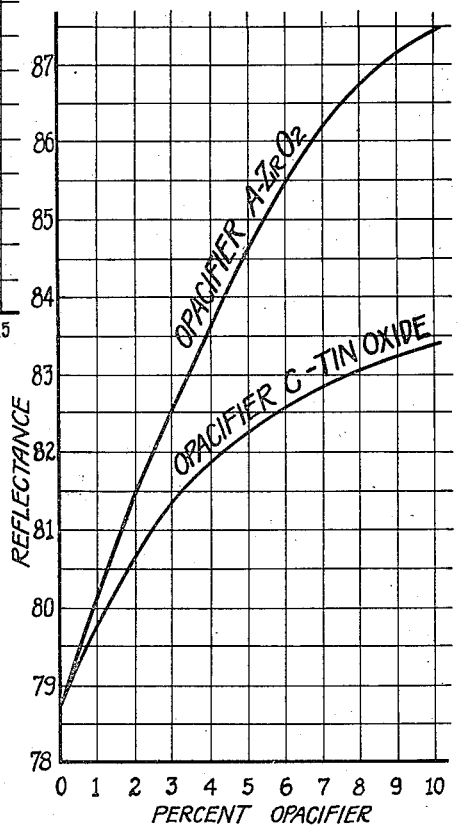

Figure 3 shows the reflectance results obtained when my new opacifier was tested as a mill addition in steps of one percent in the range of 1 to 10% in comparison with tin oxide in the same percentage steps and range, giving ten tests for the new opacifier and ten tests for tin oxide.

The frit used was a superopaque frit made up as follows:

*Batch formula (parts by weight)*

| | |
|---|---|
| Feldspar | 45.60 |
| Quartz powder | 7.54 |
| Borax | 27.50 |
| Sodium nitrate | 3.50 |
| Soda ash | 9.40 |
| Cryolite | 1.16 |
| Antimony oxide | 10.13 |
| Fluorspar | 4.74 |
| Zinc oxide | 2.32 |
| Calcium carbonate | 1.73 |
| Titanium oxide | 3.87 |
| Sodium silico fluoride | 4.00 |

The calculated melted composition of the frit produced by mixing and melting the above ingredients, pouring into water with subsequent drying the frit was substantially as follows:

| | Per cent |
|---|---|
| Na₂O+K₂O | 19.31 |
| CaF₂ | 4.74 |
| CaO | 0.97 |
| Na₃AlF₆ | 1.16 |
| ZnO | 2.32 |
| Sb₂O₅ | 10.13 |
| B₂O₃ | 10.07 |
| Al₂O₃ | 8.91 |
| TiO₂ | 3.87 |
| SiO₂ | 38.52 |
| | 100.00 |

In addition to the ten tests using tin oxide and the ten tests using my new opacifier, an enamel sample was prepared, using only 100 parts of frit, 6 parts of enameler's clay, 0.25 part of magnesium carbonate, and 40 parts of water (all parts by weight). The latter enamel showed reflectance produced by the frit, clay, magnesium carbonate only, while the others in Fig. 3 contained the opacifier. The fineness, details of milling application, and firing were the same as described in respect to the Figure 1 description.

The Figure 3 reflectance results with this superopaque frit show that the maximum reflectance increase with tin oxide was from 78.75 to 83.40, an increase of 4.65 by use of 10% SnO₂ at the mill, while in comparison my new zirconium oxide product increased the reflectance from 78.75 to 87.50, an increase of 8.75 by use of 10% at the mill. It will be observed in the study of Figure 3 that a mill addition of 3.8% of my new zirconium oxide product in this enamel produced as high reflectance results as did a mill addition of 10% SnO₂.

An examination of the apparent opacity or covering power visually in the various comparisons in Figures 1, 2 and 3 shows that the reflectance figures as determined by the opacimeter coincided with the apparent opacity insofar as optically visible.

Based on some experimental work in enameling processes which I have heretofore conducted, it was indicated that some interesting results were possible by high mill additions of the zirconium oxides then available to a frit which was milled in water to a fineness considerably greater than that normally practiced. The amount of mill addition with the zirconium oxides and frits then at hand appeared too great to be economical. With the more powerful zirconium oxide opacifier I have herein described, I again approached the idea of using a finely-milled enamel with a mill addition higher than usual, and the results were of such moment that I will include here as Figure 4 the results of a series of tests in a superopaque frit in which the indicated amounts of opacifier were milled with a modern superopaque frit along with 7% enamelers clay and 43 percent water to such a degree of frit fineness that practically all the frit particles were 44 microns or less in size. Each enamel slip was applied at various rates onto a dark ground coat previously applied to 6" x 4" pieces of 22 gauge sheet iron. The pieces carrying the coat of finely milled enamel with high mill addition opacifier were fired at 1520° F. for 2½ minutes. Reflectance readings were made and the results are presented in Figure 4 which shows in graphical form the opacity or reflectance of the enamels at various rates of application.

Figure 4:
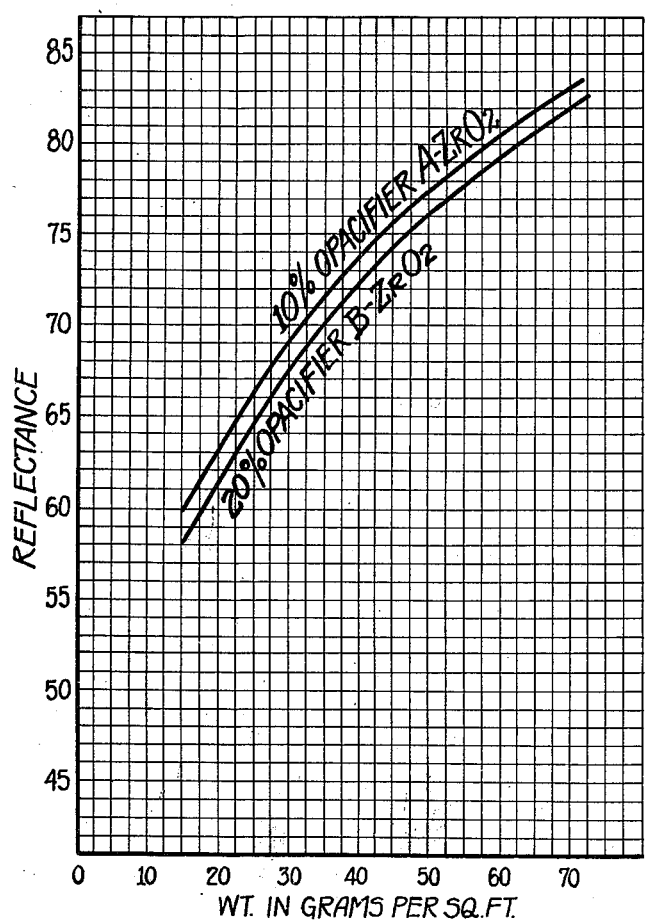

The frit used in these Fig. 4 tests is a so-called superopaque frit heavily opacified with antimony compounds, and is of the type now commonly used to produce opaque results at application rates of 45 to 65 grams per sq. ft. in one and two coats, and with mill additions of from 2 to 4 percent tin oxide or zirconium oxide type B.

*Frit formula—raw batch (parts by weight)*

| | |
|---|---|
| Feldspar | 49.70 |
| Quartz powder | 5.60 |
| Borax | 28.42 |
| Sodium nitrate | 5.00 |
| Sodium carbonate | 4.87 |
| Cryolite | 1.20 |
| Sodium antimonate | 16.00 |
| Fluorspar | 5.00 |
| Zinc oxide | 2.40 |
| Calcium carbonate | 1.78 |
| Titanium oxide | 4.00 |
| Sodium silico fluoride | 4.00 |

The raw materials are well mixed and charged to the enamel frit melting furnace at a temperature of about 2150° F., and melted down to the point where the raw materials combine to form a uniform melt which is poured into water to quench and form the frit which is then dried. Such frit is of the followed calculated composition:

| | Per cent |
|---|---|
| $Na_2O + K_2O$ | 19.19 |
| $CaF_2$ | 4.68 |
| $Na_3AlF_6$ | 1.12 |
| $ZnO$ | 2.25 |
| $Sb_2O_5$ | 12.56 |
| $B_2O_5$ | 9.74 |
| $SiO_2$ | 37.16 |
| $TiO_2$ | 3.74 |
| $Al_2O_3$ | 8.62 |
| $CaO$ | 0.94 |
| | 100.00 |

These results in Fig. 4 show that my new zirconium oxide opacifier, when added 10 parts by weight to 100 parts by weight of this superopaque frit, produces a slightly more opaque enamel at any rate of application involved than did the 20 parts by weight addition of zirconium oxide "Opacifier B," which I have heretofore described.

I claim as my invention:

1. The method of making a crystalline zirconium oxide suitable for use as an opacifier which comprises roasting at an elevated temperature but without fusion a mixture of zirconium oxide, containing a small amount of a silicon compound, and sodium carbonate in the ratio of from 4 to 12 parts of said sodium carbonate to 100 parts of zirconium oxide to decompose the mixture, stirring said mixture during said roasting step, water-washing the roasted material to remove dissolved sodium compounds, adding hydrochloric acid to the roasted material in aqueous suspension to dissolve undissolved sodium compounds therein, neutralizing the resulting material with ammonium, water-washing, and drying to form crystalline zirconia containing a minor quantity of gelatinous zirconium hydrate.

2. The method of making a crystalline zirconium oxide suitable for use as an opacifier which comprises roasting at an elevated temperature but without fusion a mixture of zirconium oxide, containing a small amount of a silicon compound, of at least 96% purity in the form of thin plates substantially all of which are less than 1 micron in thickness and sodium carbonate in the ratio of from 4 to 12 parts of said sodium carbonate to 100 parts of zirconium oxide to decompose the mixture, stirring said mixture during said roasting step, water-washing the roasted material to remove dissolved sodium compounds, adding hydrochloric acid to the roasted material in aqueous suspension to dissolve undissolved sodium compounds therein, neutralizing the resulting material with ammonia, water-washing, and drying to form crystalline zirconia having particle sizes substantially entirely less than 1 micron and containing a minor quantity of gelatinous zirconium hydrate.

3. The method of making a crystalline zirconium oxide suitable for use as an opacifier which comprises roasting at a temperature between 900° and 950° C. but without fusion a mixture of zirconium oxide, containing a small amount of a silicon compound, of at least 96% purity in the form of thin plates substantially all of which are less than 1 micron in thickness and sodium carbonate in the ratio of from 4 to 12 parts of said sodium carbonate to 100 parts of zirconium oxide to decompose the mixture, stirring said mixture during said roasting step, water-washing the roasted material to remove dissolved sodium compounds, adding hydrochloric acid to the roasted material in aqueous suspension to dissolve undissolved sodium compounds therein, neutralizing the resulting material with ammonia, water-washing, and drying to form crystalline zirconia having particle sizes substantially entirely less than 1 micron and containing a minor quantity of gelatinous zirconium hydrate.

4. A substantially white opacifier composition comprising crystalline zirconia intimately associated with a minor quantity of gelatinous zirconium hydrate.

5. A substantially white opacifier composition comprising crystalline zirconia intimately associated with a minor quantity of gelatinous zirconium hydrate, and being substantially free from alkali-metal compounds.

6. A substantially white opacifier composition comprising crystalline zirconia having particle sizes substantially entirely less than 1 micron and intimately associated with a minor quantity of gelatinuous zirconium hydrate.

7. A substantially white opacifier composition comprising crystalline zirconia having particle sizes substantially entirely less than 1 micron and intimately associated with a minor quantity of gelatinuous zirconium hydrate, and being substantially free from alkali-metal compounds.

CHARLES J. KINZIE.

2,310,242

CERTIFICATE OF CORRECTION.

Patent No. 2,310,242. February 9, 1943.

CHARLES J. KINZIE.

It is hereby certified that error appears in the printed specification of the above numbered patent requiring correction as follows: Page 1, first column, line 34, before "opacity" insert --enameling art--; page 2, second column, lines 47 and 48, for "cubes each" read --cubes. Each--; page 5, second column, line 59, after "by" strike out the comma; page 6, second column, lines 68 and 73, claims 6 and 7 respectively, for "gelatinuous" read --gelatinous--; and that the said Letters Patent should be read with this correction therein that the same may conform to the record of the case in the Patent Office.

Signed and sealed this 16th day of March, A. D. 1943.

(Seal)

Henry Van Arsdale,
Acting Commissioner of Patents.